June 20, 1961 E. D. COOK 2,989,691
TEMPERATURE MEASURING APPARATUS
Original Filed May 28, 1956 2 Sheets-Sheet 1

Inventor
Ellsworth D. Cook,
by Merton D. Moore
His Attorney

June 20, 1961     E. D. COOK     2,989,691
TEMPERATURE MEASURING APPARATUS
Original Filed May 28, 1956     2 Sheets-Sheet 2
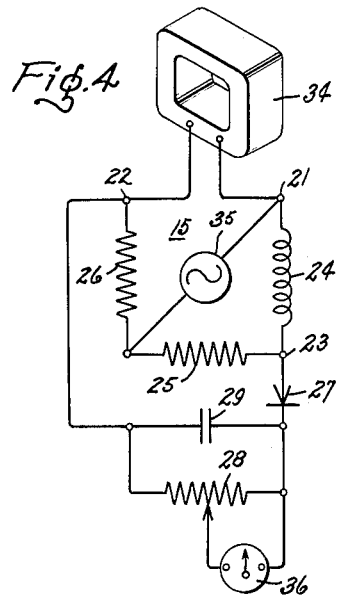
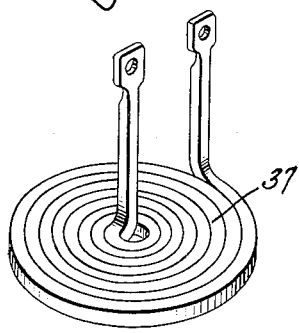
*Inventor*
*Ellsworth D. Cook*
*by Newton D. Moore*
*His Attorney*

United States Patent Office 2,989,691
Patented June 20, 1961

2,989,691
TEMPERATURE MEASURING APPARATUS
Ellsworth D. Cook, Scotia, N.Y., assignor to General Electric Company, a corporation of New York
Original application May 28, 1956, Ser. No. 587,818. Divided and this application Oct. 30, 1959, Ser. No. 849,983
5 Claims. (Cl. 324—34)

This application is a division of my copending application Serial No. 587,818, filed May 28, 1956 and assigned to the same assignee as the present invention and which is now abandoned.

This invention relates to a device for obtaining information relating to the temperature of an electrically conductive body and has for one of its objects to obtain information relating to the uniformity of the temperature within the body or relating to the ratio of the external and internal temperatures.

The invention finds particular application in determining the relationship of the internal and external temperatures of a steel ingot. It is to be understood that the term "ingot" is not intended to be limiting but includes all masses of material cast into some convenient shape for reworking. The size, shape, or weight of such a mass of material is not important to this invention. One of the serious problems encountered in a steel rolling mill, for example, is the possibility of having an ingot enter the mill with an internal temperature which is seriously different from the external temperature. This is true whether the internal temperature is such that the ingot has a molten interior with a cooler exterior or whether the interior of the ingot is cooler (and consequently harder) than the exterior of the ingot. Both situations present real problems in subsequent rolling operations. For example, if the heating process has not been continued to the extent necessary to heat the interior of the ingot to almost the same temperature as the surface, subsequent trouble will develop in working the ingot uniformly, and equipment damage may result in the rolling process. Such damage is extremely expensive both because of the cost of replacing equipment and the high cost of shutdown time. If the internal temperature of the ingot is too high relative to the external temperature, the difficulty will be experienced in working the ingot uniformly.

It is, therefore, a further object of this invention to determine the average surface temperature of an electrically conductive body and the average internal temperature of such a body, and to provide a means to compare the two temperatures.

Once an ingot is removed from a soaking pit, it must be conveyed to the rolling mill as fast as possible and worked before it has cooled. Any delay in getting the ingot from the soaking pit to the rolling mill causes a loss of heat which represents a loss of money to the mill. If the ingot becomes too cool in transit to be worked, it must be returned and reheated and then conveyed back to the mill before working. Time lost performing such functions and the reuse of the facilities for a given ingot represents additional expense. Therefore, it is preferable to obtain the information regarding both the external and internal temperature of the ingot without interfering with the normal sequence of events and without using contacting measuring devices.

Accordingly, it is a further object of this invention to determine the average surface temperature of a body and the average internal temperature of such body while the material is in motion and to provide means for comparing the two temperatures.

Two properties of a material such as steel which vary with temperature and which might be utilized to determine temperature are the magnetic permeability and the electrical resistance. The magnetic permeability cannot be used for the application contemplated for the reason that steel loses substantially all of its magnetic properties above about 750 degrees centigrade (the recalescence point of steel) and has a permeability of approximately unity (the permeability of air) above this temperature. The ingot should be above this temperature to be worked. The resistance of steel, however, is still rising with increased temperature in this range. The electrical resistivity of the material being inspected has, therefore, been selected as the primary parameter utilized to obtain the information desired. Other basic principles utilized in conjunction with this change in resistivity of the material will be recognized from the following discussion.

A further object of this invention then is to obtain information relating to the average internal and surface temperature of an electrically conductive body while the body is in motion utilizing the internal and external resistance of such body as the primary variable and to provide a means for displaying the relationship of the temperatures.

This invention is carried out utilizing the fact that the magnetic flux from an inductance coil which is energized from a voltage source of low frequency penetrates into the interior of a conductive material such as steel, which is within the magnetic field of the coil, whereas only a thin outer layer of the conductive material will be effective to carry such flux if the coil is energized from a voltage source of high frequency. As a consequence, eddy currents are set up within the conductive body by the flux from an inductance coil which is energized from a voltage source of low frequency, whereas eddy currents are only set up in the outer layer by the flux from such a coil which is energized by a high frequency source. Since the resistivity of steel is dependent upon the temperature, the impedance of an inductance coil energized from a voltage source of high frequency is directly influenced by the temperature of the thin outer layer of metal of a steel ingot which is within the magnetic field of the inductance coil, while the impedance of an inductance coil energized from a voltage source of low frequency is also influenced by the internal temperature of the metal.

The frequencies of the voltage source or sources referred to herein are selected in accordance with the material being inspected and the depth of penetration desired. For a steel ingot in the temperature range for rolling, the upper frequency may be as high as 400 kilocycles per second, and the lower frequency may be in the range of 10 to 60 cycles per second. As indicated, the frequencies selected are dependent upon the particular application, and the examples given above are not intended to be limiting.

In carrying out the invention, any variation between the external and internal temperatures of an ingot may be detected utilizing a single inductance coil and scanning the temperature of the object being inspected by positioning the coil and material so that the object is subjected to the magnetic flux from the coil, varying the frequency of the energizing voltage source between a low frequency and a high frequency and obtaining an indication of the variation in impedance of the coil. However, the comparison is preferably effected by utilizing a pair of inductance coils which are energized from alternating current voltage sources of different frequency, one voltage source being of a low frequency and the other of a high frequency. The impedance of one coil then is more affected by the internal temperature (internal resistance) of the ingot than is the other. The impedance of the two coils then may be compared to determine the relative values of the internal and external temperatures.

The comparison of external and internal temperatures of the object being inspected may be conveniently effected, using the two coils by connecting each of the coils in an initially balanced bridge circuit and exciting the two bridge circuits from voltage sources of different frequencies. Since the relationship of the impedance of the two coils indicates the relationship of the internal and external temperatures of the conductive body, the relative unbalance of the bridge circuits may also be used for this purpose. Thus, the output of the two bridge circuits may be supplied to a meter which reads the difference in voltages produced, or to a ratio meter so that the external and internal temperature may be compared directly. Obviously, alarms or controls might be substituted or utilized in addition to the meters suggested.

The novel features which are believed to be characteristic of this invention are set forth with particularity in the appended claims. The invention itself, however, both as to its organization and method of operation, together with further objects and advantages thereof, may best be understood by reference to the following description taken in connection with the accompanying drawing, in which FIG. 1 is a diagrammatic representation of an ingot on a roller conveyor passing through two coils of a temperature measuring device;

FIG. 4 diagramamtically illustrates a circuit which may be utilized to make the measurements contemplated if only one inductance coil is used; and FIG. 5 is a perspective view of another type of inductance coil which may be used for the measurements contemplated.

Figure 1:
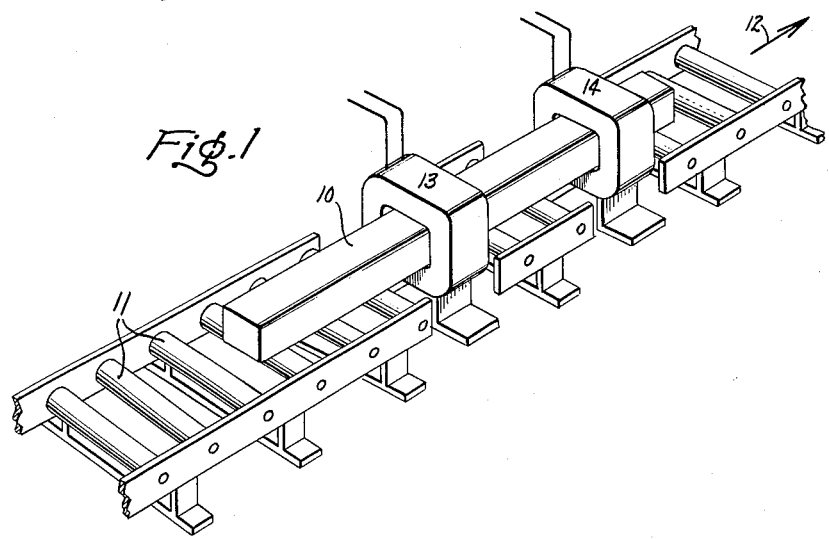

Referring specifically to FIG. 1 of the drawings, an ingot 10 which is to be passed into a rolling mill is shown moving along a roller conveyor 11 in the direction indicated by an arrow 12. The ingot 10 generally moves at a high rate of speed, for example, 360 feet per minute. Coils 13 and 14 are provided for the purpose of determining the external and internal temperature of the ingot. To this end, the ingot 10 is made to travel through the two coils in succession while the coils are energized in a manner described more fully below. It will, of course, be understood that the ingot need not be passed through the coils in the manner illustrated, but the coils may be arranged to drop over the end of the standing ingot, or many other such arrangements may be made. The particular arrangement illustrated here was chosen as a matter of convenience.

Figure 2:
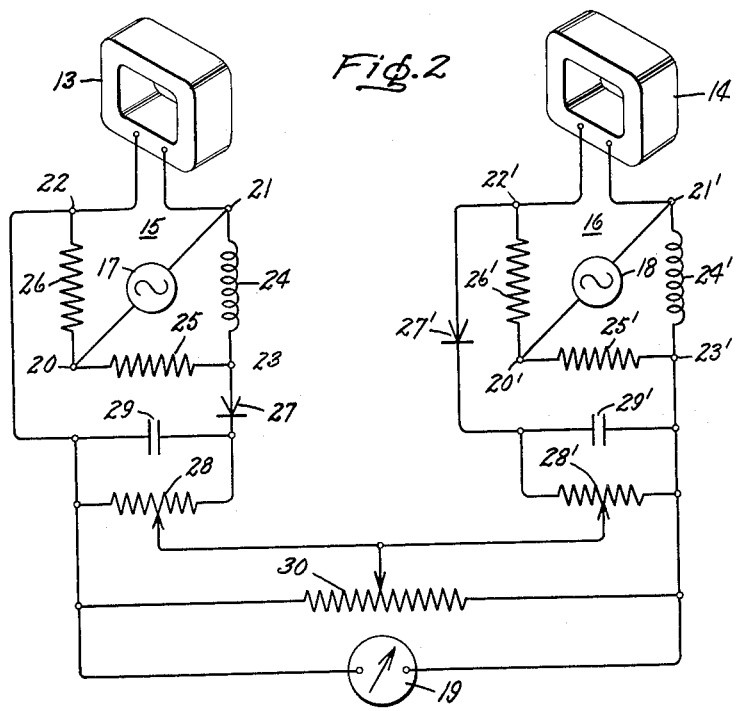
FIG. 2 is a schematic representation of a circuit which may be used for the measurements contemplated.

In order to obtain an indication of both the external and internal temperatures of the ingots, the circuitry of FIG. 2 may be used. Broadly, the circuitry illustrated in FIG. 2 consists of two bridge circuits 15 and 16 which are supplied from a source of low frequency alternating voltage 17 and a source of high frequency alternating voltage 18, respectively. A meter 19 is connected to the bridge circuits 15 and 16 in such a manner that it reads the difference in output from the two circuits and thereby indicates the difference in the average outside temperature of the ingot and the average inside temperature of the ingot.

The low frequency bridge circuit 15 has input terminals 20 and 21 which are connected to receive the voltage from a low frequency source of alternating current 17 and output terminals 22 and 23. The inductance coil 13, which is intended to surround the moving ingot, is connected in one of the ratio arms of the bridge and a fixed inductance 24 is connected in the adjacent ratio arm. For maximum sensitivity, the fixed inductance 24 preferably has an inductance value equal to that of the inductor 13 when there is an ingot inside the coil 13 which is heated to the desired temperature. The legs of the bridge which are opposite the low frequency temperature measuring inductor 13 and the fixed inductor 24, respectively, contain resistors 25 and 26 which are equal in value.

In order to utilize the voltage developed across the output terminals 22 and 23 of the bridge circuit 15, an output resistor 28 is connected therebetween and a rectifier 27 is placed in series with the output resistor. A smoothing and averaging capacitor 29 is connected directly in parallel with the output resistor 28 to smooth the pulsating direct current voltage which is applied across this parallel circuit. Any unbalance of the bridge causes a voltage to appear across the output resistor 28 which is a function of the bridge unbalance.

If the bridge 15 is initially balanced with an ingot which is heated to the desired temperature in the low frequency inductor coil 13, there will be very little unbalance caused by passing other ingots through the coil which is heated to the desired temperature. Therefore, little or no output voltage is developed across the output resistor 28 for this condition. If, however, an ingot which is not heated to the proper temperature throughout is passed through the coil 13, the bridge 15 is unbalanced and a voltage is developed across the output resistor 28. This is true since the flux from the low frequency inductor 13 varies at a low rate and penetrates the ingot, thereby setting up eddy currents within the interior of the ingot. Thus, if the internal temperature of the ingot, and consequently the internal resistance, is other than that for which the bridge was initially calibrated the inductance of coil 13 changes and the bridge becomes unbalanced. The amount of unbalance of the bridge indicates how much the internal temperature of the ingot deviates from the desired value.

The second bridge circuit 16 is intended to be excited from a source of such high frequency that only the outer metal layer of the ingot is useful in carrying flux from the high frequency inductance coil 14. Thus, the balance of the high frequency bridge circuit 16 is only influenced by the temperature of the outer layer of the ingot. The high frequency bridge 16 is composed of a number of elements which correspond in kind and, also, operate in the same manner as those elements described with respect to the low frequency bridge 15. Consequently, the elements of the high frequency bridge, which correspond to those of the low frequency bridge 15, are given the same reference numerals, and these reference numerals are primed. The bridge energizing voltage sources 17 and 18 are of different frequency and one ratio arm of the bridge 16 contains the high frequency inductor 14 rather than the low frequency inductor 13. Since the flux from the high frequency inductor 14 only penetrates the outer layer of an ingot 10 passing therethrough, and since the operation of the high frequency bridge 16 is otherwise the same as the operation of the low frequency bridge 15, it will be understood that the voltage which appears across the output resistor 28' is indicative of the external temperature of the ingot 10.

The ingots 10 are normally controlled in size and volume, and the bridges 15 and 16 are balanced for the desired operating temperatures for any one ingot. Therefore, the outputs of the two bridges may be combined in such a manner as to obtain a difference between the unbalance voltages developed, or, if desired, may be applied to a ratio meter. Thus, it will be possible to indicate differences between the internal and the external temperature of the ingots. In order to utilize the voltages which are generated across the two output resistors 28 and 28' to obtain a difference as suggested above, a center tapped mixing resistor 30 is provided and the two output resistors 28 and 28' respectively are connected across opposite halves of the mixing resistor 30 in such a manner that the output voltages from the two bridges are opposed to each other. A direct current meter 19 is then connected across mixing resistor 30 to give an indication of any difference in voltage which appears across the mixing resistor 30. Consequently, meter 19 indicates any difference between the internal and external temperature of the ingot.

Figure 3:
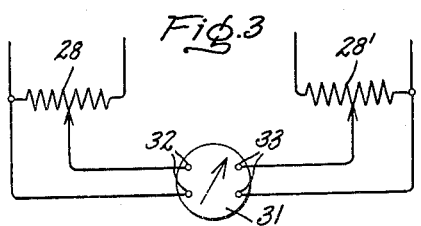
FIG. 3 is a diagrammatic representation of a ratio meter which may be used with the circuit of FIG. 2 to give an indication of the ratio of the external to internal temperature of an ingot being inspected.

If it is desired to read the ratio of the temperatures directly, a conventional ratio meter 31 may be provided, as illustrated in FIG. 3. The ratio meter 31 is provided with two pairs of input terminals (32 and 33). If the ratio meter 31 is used, the mixing resistor 30 of FIG. 2 is not needed, and one pair of input terminals 32 may be connected across the output resistor 28 of the low frequency bridge circuit 15 and the other pair of input terminals 33 connected across the output resistor 28' of the high frequency bridge circuit 16. Thus, the ratio meter 31 reads the ratio of the temperatures of the ingot 10 directly.

If it is desired to use only a single inductance coil to determine the information relating to the internal and external temperature of the electrically conducting body it is only necessary to utilize one inductance measuring circuit and a variable frequency alternating voltage source 35. This system is illustrated in FIG. 4. In this embodiment of the invention the frequency of the energizing alternating voltage source is cyclically varied from a high frequency to a low frequency so the flux from the single inductance coil 34 effectively scans the conducting object being inspected from the outer layer inwardly and thereby scans the interior of the object with eddy currents. That is to say that, when the energizing voltage source is of a high frequency the flux from the inductance coil penetrates only a thin outer layer of the ingot 10 being inspected and thereby induces eddy currents in the outer layer, as the frequency is reduced the flux penetrates progressively and thereby induces eddy currents at various depths in the ingot. Thus, the impedance of the coil 34 varies in accordance with the temperature of the ingot 10 at the depth being scanned. The variation in impedance of the coil then can be used to indicate temperature variations in the ingot.

The inductance measuring circuit illustrated in this FIG. 4 is simply the single bridge circuit 15 and its associated output circuit as illustrated in FIG. 1, except that in the circuit of FIG. 4, the measuring inductance coil is given the reference numeral 34 and the variable frequency voltage supply is given the reference numeral 35. The output circuit for the bridge circuit 15 consists of the parallel combination of the output or load resistor 28 and smoothing capacitor 29 in series with the rectifier across the output terminals 22 and 23. It will be recognized from the description of FIG. 1 that variations in impedance of the inductance coil 34 causes a variation in the output voltage which appears across the output resistor 28. In order to observe these variations and hence, variations in temperature within the ingot, a direct current voltmeter 36 is connected across at least a portion of the output resistor 28.

The previous discussion has been directed to the use of measuring inductance coils (such as 13 and 14 of FIG. 1) which are of such a construction as to surround an ingot. Obviously, the construction of the inductance coils is not critical to this invention. For some applications, coils of other configurations may be used equally well. For example, a flat or pancake type of coil, such as coil 37 of FIG. 5, may be preferable for many purposes.

While a particular embodiment of this invention has been shown, it will, of course, be understood that I am not limited thereto since many modifications, both in the circuit arrangement and in the instrumentalities employed, may be made. It is contemplated that the appended claims will cover any such modifications as fall within the true spirit and scope of this invention.

What I claim as new and desire to secure by Letters Patent of the United States is:

1. Apparatus for obtaining the ratio of the internal to surface layer temperature of an electrically conductive body comprising a first inductance coil positioned to set up eddy currents in the body and connected to be energized by a relatively low frequency source of alternating current voltage whereby said eddy currents are set up within said body, a second inductance coil positioned to set up eddy currents in the body and connected to be energized by a relatively high frequency source of alternating current voltage whereby said eddy currents are confined to the outer layer of the body, and means to obtain a ratio of the impedances of said inductance coils to thereby obtain the ratio of the temperatures externally and internally of the body.

2. In apparatus for obtaining information relating to the internal and external temperature of an electrically conductive body comprising two bridge circuits, each of said bridge circuits having individual input and output terminals and individual inductance coils in at least one ratio arm, said inductance coils being positioned to be in magnetic flux exchange relationship with the conductive body, the input terminals of said bridge circuits being connected to be energized from alternating current voltage sources of different frequency whereby the balance of one of said bridge circuits is more affected by the internal resistance of the conductive body than said other bridge circuit, individual load circuits connected across the output terminals of each of said bridge circuits to develop a voltage thereacross indicative of the unbalance of the respective bridge, and a ratio meter having two pairs of input terminals, each pair of said input terminals of said ratio meter being connected to one of said load circuits whereby the ratio of the internal and external temperature of the body is indicated.

3. The method of measuring both the internal and external temperature of a hot metal ingot comprising subjecting the ingot to a high frequency inductive field, deriving an output signal which is representative of the magnitude of the eddy currents induced in said ingot by said high frequency inductive field and which is related to the external temperature of the ingot, subjecting the ingot to a low frequency inductive field, deriving an output signal which is representative of the magnitude of the eddy currents induced in said ingot by the low frequency inductive field and which is related to the internal temperature of the ingot, and deriving an output indication of any difference in the two signals.

4. The method of measuring the temperature both internally and externally of a hot steel ingot comprising subjecting the ingot to a high frequency inductive field, deriving an output electric signal which is representative of the eddy currents induced in said ingot by said high frequency inductive field and which is related to a desired external temperature of the ingot, subjecting the ingot to a low frequency inductive field, deriving an output electric signal which is representative of the eddy currents induced in said ingot by said low frequency inductive field and which is related to a desired internal temperature of the ingot, combining the two electric signals in opposing relation to obtain a balanced condition indicative of a desired internal and external temperature relationship for the ingot, and deriving an output indication of any departure from the balanced condition.

5. The method of measuring both the internal and external temperature of a hot steel ingot comprising subjecting the ingot to an inductive field, varying the frequency of the inductive field over a range of values including both low and high frequencies, deriving an output signal which is representative of the magnitude of the eddy currents induced in the ingot by both high frequency and low frequency inductive fields, and deriving an output indication of any difference in the signals produced by the low frequency and high frequency inductive fields.

References Cited in the file of this patent

UNITED STATES PATENTS

| | | |
|---|---|---|
| 1,697,148 | Spooner | Jan. 1, 1929 |
| 2,020,067 | Keinath | Nov. 5, 1935 |
| 2,337,231 | Cloud | Dec. 21, 1943 |
| 2,744,233 | Paivinen | May 1, 1956 |